US011146491B1

(12) United States Patent
Mericle et al.

(10) Patent No.: US 11,146,491 B1
(45) Date of Patent: Oct. 12, 2021

(54) DYNAMICALLY BALANCING INBOUND TRAFFIC IN A MULTI-NETWORK INTERFACE-ENABLED PROCESSING SYSTEM

(71) Applicant: International Business Machines Corporation, Armonk, NY (US)

(72) Inventors: Grant Mericle, Durham, NC (US); Michael Jon Fox, New Hill, NC (US); Benjamin Thomas Rau, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/844,350

(22) Filed: Apr. 9, 2020

(51) Int. Cl.
*H04L 12/28* (2006.01)
*G06F 15/16* (2006.01)
*H04L 12/803* (2013.01)
*H04L 29/12* (2006.01)
*H04L 12/46* (2006.01)

(52) U.S. Cl.
CPC ........ *H04L 47/125* (2013.01); *H04L 12/4641* (2013.01); *H04L 61/2007* (2013.01)

(58) Field of Classification Search
CPC H04L 47/125; H04L 12/4641; H04L 61/2007
USPC ........................................................ 709/235
See application file for complete search history.

(56) References Cited

U.S. PATENT DOCUMENTS

| 5,864,535 | A | 1/1999 | Basilico | |
|---|---|---|---|---|
| 6,941,384 | B1 | 9/2005 | Aiken, Jr. et al. | |
| 7,159,034 | B1 | 1/2007 | Rai | |
| 7,392,318 | B1 | 6/2008 | Rai | |
| 7,991,859 | B1 * | 8/2011 | Miller | H04L 45/02 709/220 |
| 10,728,145 | B2 * | 7/2020 | Rao | H04L 45/586 |
| 2004/0111529 | A1 | 6/2004 | Parmar | |
| 2005/0050179 | A1 * | 3/2005 | Diehl | H04L 29/12783 709/221 |
| 2006/0241968 | A1 | 10/2006 | Hollebeek | |
| 2009/0106404 | A1 * | 4/2009 | Christenson | H04L 29/12952 709/222 |
| 2009/0125615 | A1 * | 5/2009 | Murray | H04L 61/103 709/221 |
| 2011/0176425 | A1 | 7/2011 | Li et al. | |
| 2015/0312115 | A1 | 10/2015 | Clubb et al. | |
| 2016/0080505 | A1 * | 3/2016 | Sahin | H04L 67/1027 709/229 |

(Continued)

OTHER PUBLICATIONS

International Search Report and Written Opinion Issued in International Application No. PCT/IB2021/051796 dated May 26, 2021; 9 Pages.

*Primary Examiner* — Ruolei Zong
(74) *Attorney, Agent, or Firm* — Cantor Colburn LLP; Teddi Maranzano

(57) ABSTRACT

Examples described herein provide a computer-implemented method that includes registering at least one of a plurality of virtual internet protocol addresses (VIPAs) to each of a plurality of network adapters. The method further includes distributing, by each of the plurality of network adapters, inbound data among each of the plurality of network adapters using an address resolution protocol.

16 Claims, 6 Drawing Sheets

(56) References Cited

U.S. PATENT DOCUMENTS

| | | | |
|---|---|---|---|
| 2016/0173334 A1* | 6/2016 | Gavrilovic | H04L 45/745 709/222 |
| 2017/0126436 A1* | 5/2017 | Du | H04L 41/5054 |
| 2017/0126791 A1* | 5/2017 | Herr | H04L 67/1002 |
| 2018/0041470 A1* | 2/2018 | Schultz | H04L 47/24 |
| 2018/0109606 A1* | 4/2018 | Alpert | H04L 45/586 |
| 2019/0007364 A1* | 1/2019 | Wang | H04L 61/103 |

* cited by examiner

DYNAMICALLY BALANCING INBOUND TRAFFIC IN A MULTI-NETWORK INTERFACE-ENABLED PROCESSING SYSTEM

BACKGROUND

Embodiments described herein generally relates to processing systems, and more specifically, to dynamically balancing inbound traffic in a multi-network interface-enabled processing system.

A processing system (e.g., a laptop computing system, a desktop computing system, a server computing system, a tablet computing system, etc.) can include one or more network interface cards (NICs) that enable the processing system to communicate with other processing systems. In some cases, the one or more NICs enable the processing system to connect to a network (e.g., the Internet, a local area network, a wide area network, etc.).

SUMMARY

Embodiments of the present invention are directed to dynamically balancing inbound traffic in a multi-network interface-enabled processing system.

A non-limiting example computer-implemented method includes registering at least one of a plurality of virtual internet protocol addresses (VIPAs) to each of a plurality of network adapters. The method further includes distributing, by each of the plurality of network adapters, inbound data among each of the plurality of network adapters using an address resolution protocol.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

To easily identify the discussion of any particular element or act, the most significant digit or digits in a reference number refer to the figure number in which that element is first introduced.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for dynamically balancing inbound traffic in a multi-network interface-enabled processing system. In some environments, processing systems are configured with multiple network interface cards (NICs), which are also referred to as network adapters, on a virtual local area network (VLAN) for redundancy. Network adapters, such as those described herein, can utilize address resolution protocol (ARP) offload support. As one such example, IBM's z/OS network environment utilizes open systems adapters (OSAs) as network adapters. In some environments, multiple virtual internet protocol addresses (VIPAs) represent multiple applications and prevent connection loss in the event of network adapter (i.e., network adapter) failure.

Figure 1:
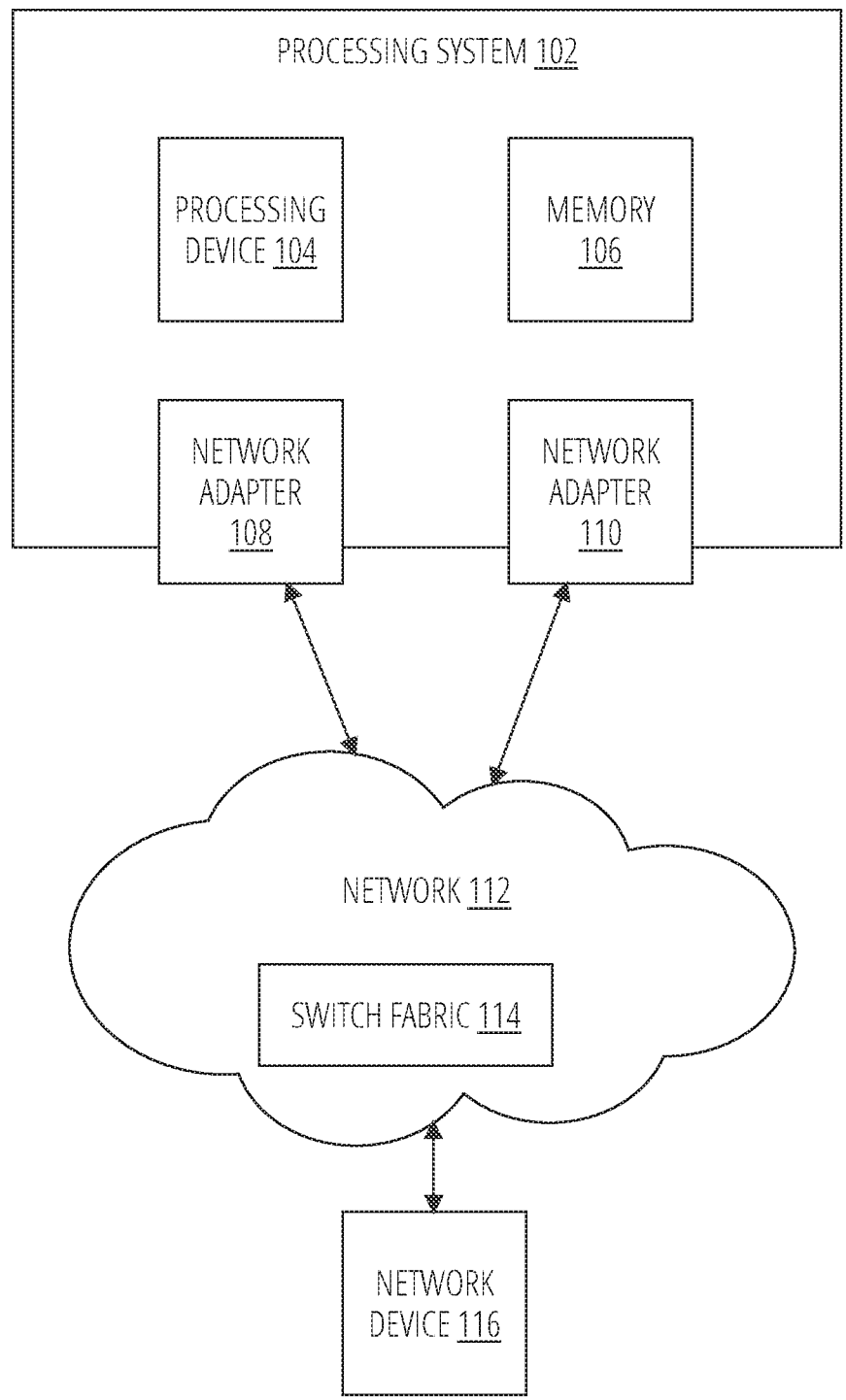
FIG. 1 depicts a block diagram of a processing system according to one or more embodiments described herein.

FIG. 1 depicts a block diagram of a processing system 102 according to aspects of the present disclosure. The processing system 102 of this example includes a processing device 104 and a memory 106. According to aspects of the present disclosure, the techniques described herein can be implemented in a combination of hardware and programming. The programming can be processor executable instructions stored on a tangible memory, and the hardware can include processing device 104 for executing those instructions. Thus a system memory (e.g., memory 106) can store program instructions that when executed by the processing device 104 implement the techniques described herein.

Figure 6:
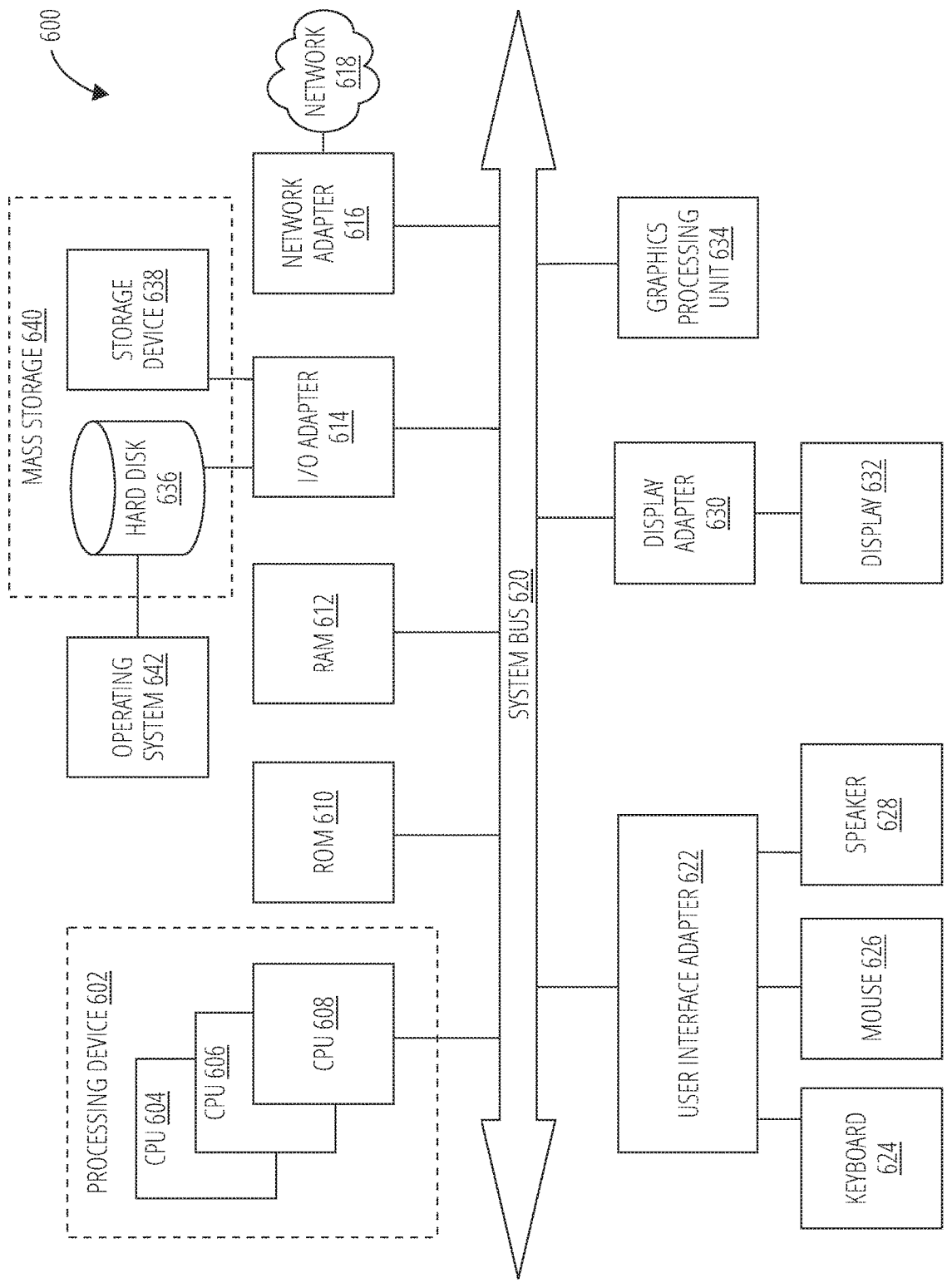
FIG. 6 depicts a block diagram of a processing system for implementing the presently described techniques according to one or more embodiments described herein.

The processing system 102 can also include one or more network adapters (e.g., the network adapter 616 of FIG. 6). In the example of FIG. 1, the processing system 102 includes two network adapters, which are referred to as open systems adapters (OSAs) as follows: network adapter 108, network adapter 110. Each of the network adapter 108, network adapter 110 is communicatively connected to a network device 116 via a network 112 as shown by the arrows of FIG. 1, which can represent wired and/or wireless links. It should be appreciated that the present techniques can be used with other numbers and/or types of network adapters; for example, additional OSAs can be used, including three OSAs, four OSAs, five OSAs, six OSAs, etc. For example, it may be useful to utilize more than one network adapter for redundancy, which provides load balancing, resilience, and the like. In the case of load balancing, network traffic can be split across multiple interfaces, and in the case of resilience, a failure of a network adapter does not cut off the processing systems network access because the other network adapter can support network communication.

The network 112 represents any one or a combination of different types of suitable communications networks such as, for example, cable networks, public networks (e.g., the Internet), private networks, wireless networks, cellular networks, or any other suitable private and/or public networks.

Further, the network 112 may have any suitable communication range associated therewith and may include, for example, global networks (e.g., the Internet), metropolitan area networks (MANs), wide area networks (WANs), local area networks (LANs), or personal area networks (PANs). In addition, the network 112 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof. In some examples, the network 112 includes a switch fabric 114, which switches network traffic/data between devices, such as between the processing system 102 and the network device 116.

In the example of FIG. 1, the processing system 102 configured and arranged as shown utilizes the network adapter 108 and network adapter 110 on the same subnet. Such a configuration is useful for static routing (i.e., when dynamic routing is not being used). This enables the use of a flat layer-2 network. The processing system 102 can utilize a multi-homed host approach, in which each of the interfaces (i.e., the network adapter 108, the network adapter 110) are presented to a stack executing on the processing system 102 and to the network 112 as separate internet protocol (IP) interfaces. In such examples, each stack's network layer sees multiple IP interfaces, which can be accessed and controlled individually. The network 112 sees multiple IP interfaces as well, which can be routed to individually. Each of the IP interfaces uses its own IP address. In other examples, the processing system 102 can utilize the network adapter 108, network adapter 110 on different subnets. This approach can be useful in situations where dynamic routing is being used.

In IBM's z/OS network environment, it may be desirable configure multiple network adapters (e.g., the network adapter 108, network adapter 110) on a single virtual local area network (VLAN) for redundancy. It may also be desirable to use multiple virtual IP addresses (VIPAs) to represent multiple applications and prevent connection loss in the event of a network adapter failure. This works because each VIPA on a stack can be reached from any network adapter (e.g., any of the network adapter 108, network adapter 110). When the VIPAs are defined in the same subnet as the network adapter 108, network adapter 110, one of the network adapter 108, network adapter 110 takes responsibility for responding to address resolution protocol (ARP) requests and sending gratuitous ARPs for the VIPAs. This network adapter (e.g., the one of the network adapter 108, network adapter 110) is referred to as the "VIPA Owner" and, because it is the VIPA Owner, its MAC address (virtual or real) is seen by the rest of the network 112 as the MAC address for each of the VIPAs that are registered to it.

Because a single network adapter acts as the VIPA owner, all inbound packets destined for any VIPA will traverse through that one network adapter acting as the VIPA owner, to the exclusion of any other OSAs on that same subnet that would otherwise be available for inbound traffic. This can cause that single network adapter to become overloaded, leading to possible packet loss, performance issues, and unbalanced usage of the network adapter adapters.

Some conventional approaches utilize link aggregation. However, link aggregation is not a function supported on z/OS by IBM. Some other conventional approaches use a layer 3 dynamic routing protocol such as Open Shortest Path First (OSPF) to advertise VIPA addresses over each of the OSAs. However, because of the processing and administrative burdens imposed on z/OS by implementing dynamic routing, this solution is not desirable such as in smaller, less complex networks.

Accordingly, the present techniques address these and other shortcomings of conventional approaches by providing a technique for balancing inbound traffic across OSAs in a z/environment. More particularly, the VIPA Owner functionality is implemented by registering (using Transmission Control Protocol/Internet Protocol (TCP/IP)) each VIPA to a single eligible network adapter existing in the same subnet as the VIPA. According to one or more embodiments described herein, inbound traffic is spread across the available network adapters by registering applicable VIPAs across eligible network adapters. For example, applicable VIPAs can be registered evenly across eligible network adapters (e.g., for 100 VIPAs and 4 OSA adapters in the same subnet, 25 VIPAs are registered/assigned to each network adapter. In some examples, inbound packet count or data count for each VIPA is monitored such as for a set time interval. Individual VIPAs can be re-registered to a different OSA in order to better balance packet/data counts across the network adapters. In some cases, balancing can be based on byte counts, classes of service, security classifications of different interfaces, etc.

Figure 2:
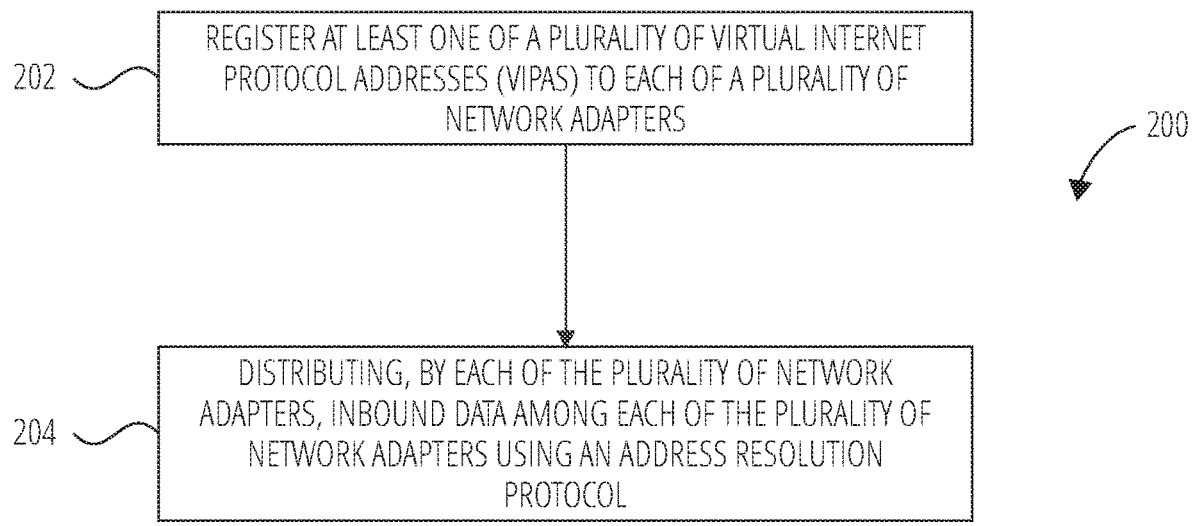
FIG. 2 illustrates a method for performing inbound load balancing in accordance with one embodiment.
Figure 3:
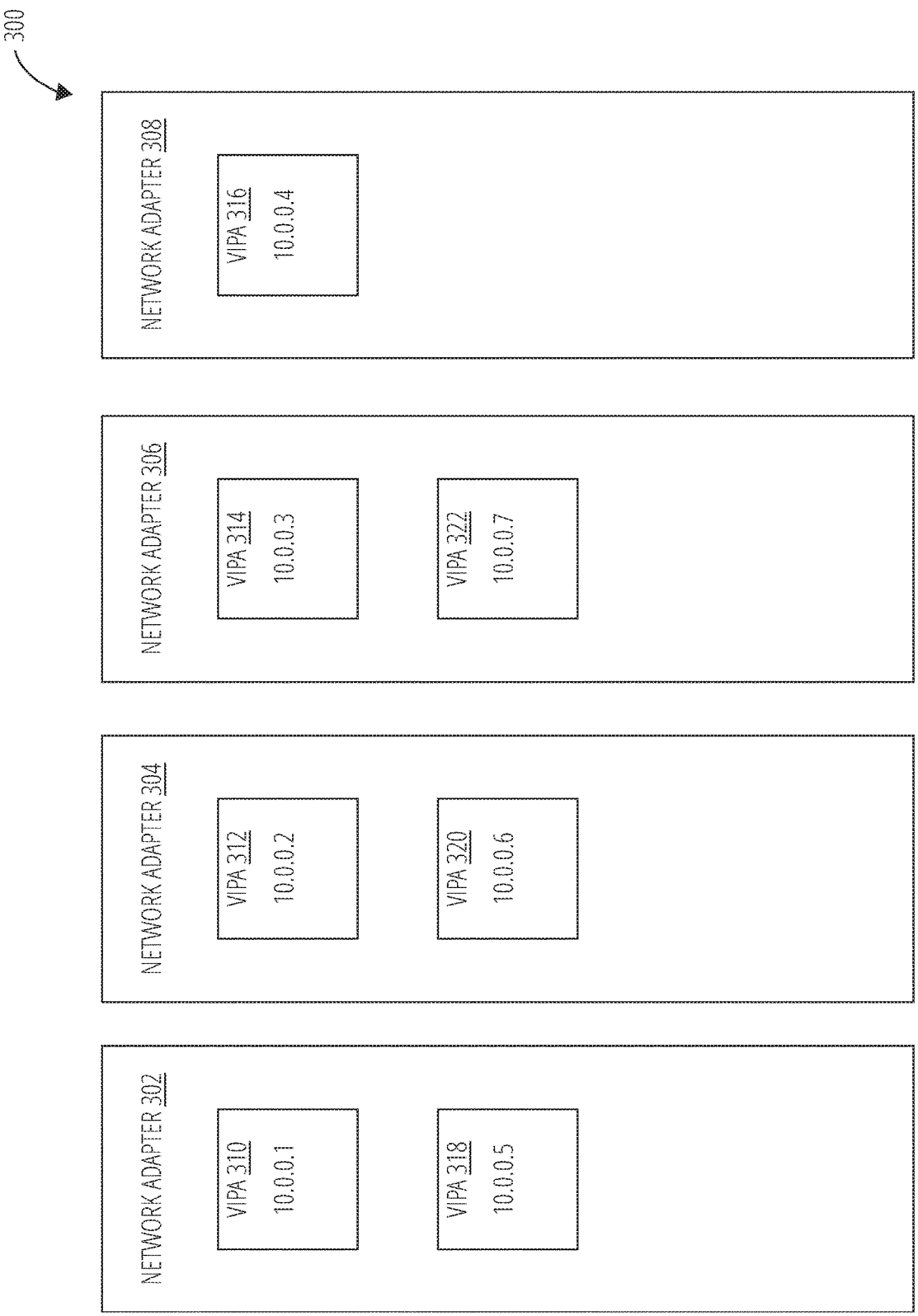
FIG. 3 depicts a block diagram of a processing system having multiple open systems adapters, the open systems adapters having virtual internet protocol addresses assigned thereto according to a round-robin technique according to one or more embodiments described herein.
Figure 4:
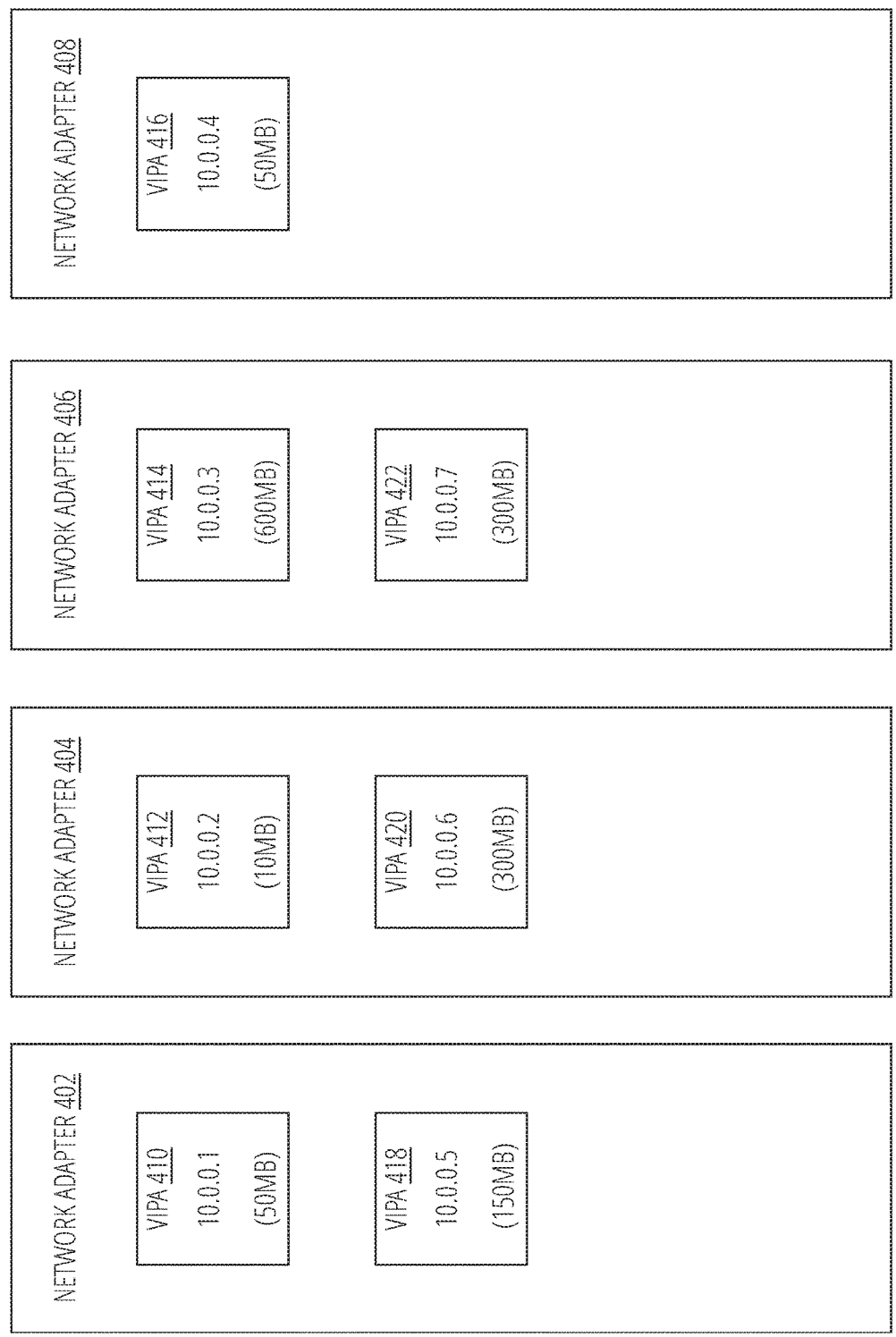
FIG. 4 depicts a block diagram of a processing system having multiple open systems adapters, the open systems adapters having virtual internet protocol addresses assigned thereto according to a round-robin technique according to one or more embodiments described herein.
Figure 5:
FIG. 5 depicts a block diagram of the processing system of FIG. 4, the open systems adapters having virtual internet protocol addresses re-assigned thereto according to a load balancing technique according to one or more embodiments described herein.
Figure 5:
Figure 5:
Figure 5:
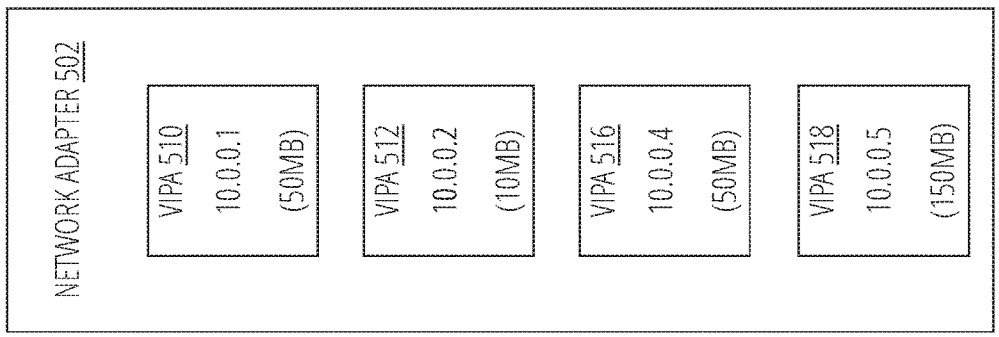

FIG. 2 illustrates a method 200 for performing inbound load balancing in accordance with one embodiment. The method 200 can be performed by any suitable processing system (e.g., the processing system 102, the processing system 600, etc.), any suitable processing device (e.g., the processing device 104, the processing device 602, etc.) and/or combinations thereof. The method 200 is described with reference to FIG. 1, FIG. 3, FIG. 4, and FIG. 5 but is not so limited. In particular, FIG. 3, FIG. 4, and FIG. 5 depict various embodiments of four network adapters having seven VIPAs registered among them. With reference to these three figures, the leading digit of the element number differs with respect to the figure number, but the three figures otherwise depict and refer to the same network adapters/VIPAs. For example, the VIPA 310, the VIPA 410, and the VIPA 510 are the same VIPA in different embodiments. Similarly, the network adapter 302, the network adapter 402, and the network adapter 502 are the same OSA in different embodiments.

In block 202, method 200 includes the processing system 102 registering at least one of a plurality of virtual internet protocol addresses (VIPAs) to each of a plurality of open systems adapters (OSAs). Registration implies that an OSA interface of the network adapters will send gratuitous ARP packets as well as respond to ARP requests for registered VIPA addresses. In block 204, the method 200 includes distributing, by each of the plurality of network adapters, inbound data among each of the plurality of network adapters using an address resolution protocol (gratuitous and responses). The features and functional of the block 202 and block 204 are now described with reference to FIG. 3, FIG. 4, and FIG. 5.

With reference to FIG. 3 as an example, a block diagram of a processing system 300 having four open systems adapters (i.e., network adapter 302, network adapter 304, network adapter 306, network adapter 308) is depicted. The processing system 300 also includes seven virtual IP addresses (i.e., VIPA 310, VIPA 312, VIPA 314, VIPA 316, VIPA 318, VIPA 320, VIPA 322) that are registered to the network adapter 302, network adapter 304, network adapter 306, network adapter 308 as shown. In this example, the VIPAs are registered based on round-robin registration according to one or more embodiments described herein.

That is, VIPA 310 is assigned to network adapter 302, then VIPA 312 is registered to network adapter 304, VIPA 314 is registered to network adapter 306, VIPA 316 is registered to network adapter 308. Once each of the network adapters has a VIPA registered thereto, the round-robin registration repeats for additional VIPAs: VIPA 318 is registered to network adapter 302, VIPA 320 is registered to network adapter 304, and VIPA 322 is registered to network adapter 306.

According to another embodiment, byte-count registration is performed. Byte-count registration begins with round-robin registration (see FIG. 3) and then inbound byte counts are measured over a set time interval. After the set time interval, the in-bound byte count per OSA is compared. If the difference between totals exceeds a threshold for example, rebalancing is initiated. During the rebalancing, one or more VIPAs can have their registration moved to a different network adapter so that the in-byte counts of the VIPAs are more evenly balanced among the network adapters. In some examples, the in-bound byte count can consider non-VIPA packets. In some examples, moving the VIPA causes the network adapter that it moved to perform a gratuitous ARP so that inbound traffic for the VIPA starts going to it instead of the previous owner.

FIG. 4 and FIG. 5 together depict a block diagram of a processing system 400 having four open systems adapters (i.e., network adapter 402/network adapter 502, network adapter 404/network adapter 504, network adapter 406/network adapter 506, network adapter 408/network adapter 508). Like the example of FIG. 3, the network adapters in FIG. 4 are first registered using the round-robin registration approach as described herein. However, in this example, over the course of a set time interval (e.g., 20 seconds, 45 seconds, 1 minute, 2 minutes, 5 minutes, etc.), inbound data is monitored with respect to each of VIPA 410, VIPA 412, VIPA 414, VIPA 416, VIPA 418, VIPA 420, VIPA 422.

That is, as shown in block 204 of FIG. 2, the method 200 includes the processing system 102 distributing inbound data among each of the plurality of OSAs (i.e., network adapter 402/network adapter 502, network adapter 404/network adapter 504, network adapter 406/network adapter 506, network adapter 408/network adapter 508). As the inbound data is distributed among each of the plurality of OSAs, the processing system 102 monitors how much inbound data is received at each VIPA (e.g., VIPA 410, VIPA 412, VIPA 414, VIPA 416, VIPA 418, VIPA 420, VIPA 422). The amount of inbound data (i.e., in-bound byte count) is determined and is shown for each VIPA in FIG. 4 and FIG. 5. After the set time interval (which can be adjustable) has passed, the VIPAs can be reregistered to other network adapters to provide balanced loads for each network adapter. For example, as shown in FIG. 4, network adapter 406 has two registered VIPAs: VIPA 414 (which has an in-bound byte count of 600 MB of inbound data) and VIPA 422 (which has an in-bound byte count of 300 MB of inbound data). As can be observed, these represent two of the VIPAs with the largest in-bound byte counts. As a result, network adapter 406 is overloaded relative to network adapter 402, network adapter 404, and network adapter 406. Accordingly, the VIPAs of FIG. 4 can be re-registered based on their respective in-bound byte counts to balance the inbound data as shown in FIG. 5. In some examples, re-registration occurs based on a total amount of received in-bound data (e.g., every 1 GB), based on time, based on network conditions, detected failure conditions, and other triggers.

According to one or more embodiments described herein, each of the plurality of network adapters resides on a common internet protocol stack. Moreover, in some examples, each of the plurality of network adapters is configured on a common subnet or virtual local area network as shown in FIG. 3, FIG. 4, and FIG. 5.

It is understood that one or more embodiments described herein is capable of being implemented in conjunction with any other type of computing environment now known or later developed. For example, FIG. 6 depicts a block diagram of a processing system 600 for implementing the techniques described herein. In examples, processing system 600 has a processing device 602, which could include one or more central processing units CPU 604, CPU 606, CPU 608, etc. (collectively or generically referred to as processor, processing device, and/or as processing device(s)). In aspects of the present disclosure, the processing device 602 can include a reduced instruction set computer (RISC) microprocessor. In some examples, the processing device 602 and or the CPU 604, the CPU 606, and/or the CPU 608 can include multiple processing cores for simultaneously/concurrently executing instructions. The processing device 602 is coupled to system memory (e.g., random access memory RAM 612) and various other components via a system bus 620. Read only memory ROM 610 is coupled to system bus 620 and may include a basic input/output system (BIOS), which controls certain basic functions of processing system 600.

Further depicted are an input/output I/O adapter 614 and a network adapter 616 coupled to system bus 620. The network adapter 616 may be a small computer system interface (SCSI) adapter that communicates with a hard disk 636 and/or a storage device 638 or any other similar component. I/O adapter 614, hard disk 636, and storage device 638 are collectively referred to herein as mass storage 640. Operating system 642 for execution on processing system 600 may be stored in mass storage 640. The network adapter 616 interconnects system bus 620 with an outside network 618 enabling the processing system 600 to communicate with other such systems.

A display 632 (e.g., a display monitor) is connected to the system bus 620 by a display adapter 630, which may include a graphics adapter to improve the performance of graphics intensive applications and a video controller. In one aspect of the present disclosure, I/O adapter 614, network adapter 616, and/or display adapter 630 may be connected to one or more I/O busses that are connected to the system bus 620 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 620 via user interface adapter 622 and the display adapter 630. A keyboard 624, a mouse 626, and a speaker 628 may be interconnected to the system bus 620 via the user interface adapter 622, which may include, for example, a Super I/O chip integrating multiple device adapters into a single integrated circuit.

In some aspects of the present disclosure, the processing system 600 includes a graphics processing unit 634. The graphics processing unit 634 is a specialized electronic circuit designed to manipulate and alter memory to accelerate the creation of images in a frame buffer intended for output to a display. In general, the graphics processing unit 634 is very efficient at manipulating computer graphics and image processing, and has a highly parallel structure that makes it more effective than general-purpose CPUs for algorithms where processing of large blocks of data is done in parallel.

Thus, as configured herein, the processing system 600 includes processing capability in the form of the processing device 602, storage capability including system memory (e.g., RAM 612), and mass storage 640, input means such as keyboard 624 and mouse 626, and output capability including speaker 628 and display 632. In some aspects of the present disclosure, a portion of system memory (e.g., RAM 612) and mass storage 640 collectively store the operating system 642 such as the AIX® operating system from IBM Corporation to coordinate the functions of the various components shown in the processing system 600.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for performing inbound load balancing, the method comprising:

registering, based at least in part on data usage registration, at least one of a plurality of virtual internet protocol addresses (VIPAs) to each of a plurality of network adapters, the registering comprising registering a first VIPA to a first network adapter of the plurality of network adapters and registering a second VIPA to a second network adapter of the plurality of network adapters, the first VIPA differing from the second VIPA; and distributing, by each of the plurality of network adapters, inbound data among each of the plurality of network adapters using an address resolution protocol, wherein the data usage registration comprises monitoring the inbound data to determine an in-bound byte count for each of the plurality of VIPAs, wherein the monitoring occurs for a set time interval.

2. The method of claim 1, wherein registering the at least one of the plurality of VIPAs to each of the plurality of network adapters is based at least in part on round-robin registration.

3. The method of claim 1, wherein registering the at least one of the plurality of VIPAs to each of the plurality of network adapters is based at least in part on the in-bound byte count for each of the plurality of VIPAs.

4. The method of claim 1 further comprising:

re-registering the at least one of the plurality of VIPAs to each of the plurality of network adapters is based at least in part on an in-bound byte count for each of the plurality of VIPAs.

5. The method of claim 1, wherein each of the plurality of network adapters resides on a common internet protocol stack, and wherein each of the plurality of network adapters is configured on a common subnet or virtual local area network.

6. The method of claim 1, wherein the plurality of network adapters includes at least one open systems adapter.

7. A system comprising:

a memory comprising computer readable instructions; and a processing device for executing the computer readable instructions, the computer readable instructions controlling the processing device to perform operations comprising:

registering, based at least in part on data usage registration, at least one of a plurality of virtual internet protocol addresses (VIPAs) to each of a plurality of network adapters, the registering comprising registering a first VIPA to a first network adapter of the plurality of network adapters and registering a second VIPA to a second network adapter of the plurality of network adapters, the first VIPA differing from the second VIPA; and distributing, by each of the plurality of network adapters, inbound data among each of the plurality of network adapters using an address resolution protocol, wherein the data usage registration comprises monitoring the inbound data to determine an in-bound byte count for each of the plurality of VIPAs, wherein the monitoring occurs for a set time interval.

8. The system of claim 7, wherein registering the at least one of the plurality of VIPAs to each of the plurality of network adapters is based at least in part on round-robin registration.

9. The system of claim 7, wherein
registering the at least one of the plurality of VIPAs to each of the plurality of network adapters is based at least in part on the in-bound byte count for each of the plurality of VIPAs.

10. The system of claim 7, the operations further comprising:
re-registering the at least one of the plurality of VIPAs to each of the plurality of network adapters is based at least in part on an in-bound byte count for each of the plurality of VIPAs.

11. The system of claim 7, wherein each of the plurality of network adapters resides on a common internet protocol stack, and wherein each of the plurality of network adapters is configured on a common subnet or virtual local area network.

12. The system of claim 7, wherein the plurality of network adapters includes at least one open systems adapter.

13. A computer program product comprising a computer readable storage medium having program instructions embodied therewith, the program instructions executable by a processor to cause the processor to perform operations comprising:

registering, based at least in part on data usage registration, at least one of a plurality of virtual internet protocol addresses (VIPAs) to each of a plurality of network adapters, the registering comprising registering a first VIPA to a first network adapter of the plurality of network adapters and registering a second VIPA to a second network adapter of the plurality of network adapters, the first VIPA differing from the second VIPA; and distributing, by each of the plurality of network adapters, inbound data among each of the plurality of network adapters using an address resolution protocol, wherein the data usage registration comprises monitoring the inbound data to determine an in-bound byte count for each of the plurality of VIPAs, wherein the monitoring occurs for a set time interval.

14. The computer program product of claim 13, wherein registering the at least one of the plurality of VIPAs to each of the plurality of network adapters is based at least in part on round-robin registration.

15. The computer program product of claim 13, wherein registering the at least one of the plurality of VIPAs to each of the plurality of network adapters is based at least in part on data usage registration.

16. The computer-implemented method of claim 1, wherein the registering further comprises registering a third VIPA to the first network adapter of the plurality of network adapters, the third VIPA differing from the first VIPA and the second VIPA.

* * * * *